United States Patent
Keinert et al.

(10) Patent No.: US 8,429,584 B2
(45) Date of Patent: Apr. 23, 2013

(54) METHOD, ELECTRONIC DESIGN AUTOMATION TOOL, COMPUTER PROGRAM PRODUCT, AND DATA PROCESSING PROGRAM FOR CREATING A LAYOUT FOR DESIGN REPRESENTATION OF AN ELECTRONIC CIRCUIT AND CORRESPONDING PORT FOR AN ELECTRONIC CIRCUIT

(75) Inventors: Joachim Keinert, Altdorf (DE); Thomas Ludwig, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 12/861,087

(22) Filed: Aug. 23, 2010

(65) Prior Publication Data
US 2011/0113395 A1 May 12, 2011

(30) Foreign Application Priority Data
Nov. 11, 2009 (DE) .................... 09175674

(51) Int. Cl.
*G06F 17/50* (2006.01)
*G06F 9/455* (2006.01)

(52) U.S. Cl.
USPC ............................ 716/113; 716/118; 716/126

(58) Field of Classification Search .................. 716/113, 716/118, 126
See application file for complete search history.

(56) References Cited

U.S. PATENT DOCUMENTS

| | | | |
|---|---|---|---|
| 5,550,748 A | 8/1996 | Xiong | |
| 5,629,860 A * | 5/1997 | Jones et al. | 716/113 |
| 6,230,304 B1 * | 5/2001 | Groeneveld et al. | 716/113 |
| 6,308,302 B1 | 10/2001 | Hathaway et al. | |
| 6,493,859 B1 | 12/2002 | Gould et al. | |
| 6,532,583 B1 * | 3/2003 | Shibuya | 716/114 |
| 7,010,771 B2 | 3/2006 | Teig et al. | |
| 7,131,096 B1 | 10/2006 | Balsdon et al. | |
| 7,260,802 B2 * | 8/2007 | Ho et al. | 716/123 |
| 7,480,885 B2 | 1/2009 | Frankle et al. | |
| 2009/0013290 A1 | 1/2009 | Keinert et al. | |

OTHER PUBLICATIONS

Iizuka et al., "Timing-Driven Redundant Contact Insertion for Standard Cell Yield Enhancement" 13th IEEE International Conference on Electronics, Circuits and Systems, 2006, pp. 704-707.

Chen et al., "FPGA Design Automation: A Survey", Foundations and Trends in Electronic Design Automation, vol. 1, No. 3, Nov. 2006, pp. 195-330.

"Encounter Menu Reference Product Version 5.2.3", Cadence, Jun. 2006, 1320 pages.

* cited by examiner

*Primary Examiner* — Stacy Whitmore
*Assistant Examiner* — Magid Dimyan
(74) *Attorney, Agent, or Firm* — Yee & Associates, P.C.; Diana R. Gerhardt

(57) ABSTRACT

A method for creating a layout for design representation of an electronic circuit with at least one port. The method includes segmenting the at least one port in the design representation into different regions, classifying the different regions of the at least one port according to timing and/or electronic and/or layout characteristics, assigning a priority for each classified region of the at least one port according to rules based on the timing and/or electronic and/or layout characteristics, and routing the design representation by accessing at least one of the classified regions of the port according to an order of the assigned priorities.

15 Claims, 8 Drawing Sheets

METHOD, ELECTRONIC DESIGN AUTOMATION TOOL, COMPUTER PROGRAM PRODUCT, AND DATA PROCESSING PROGRAM FOR CREATING A LAYOUT FOR DESIGN REPRESENTATION OF AN ELECTRONIC CIRCUIT AND CORRESPONDING PORT FOR AN ELECTRONIC CIRCUIT

BACKGROUND

1. Field

The present invention relates in general to the field of electronic design automation (EDA) tools for integrated or electronic circuits wiring design. In particular, this invention provides the capability for EDA tools to effectively deal with accessing ports and/or pins of the integrated or electronic circuits (IC). More particularly, the present invention relates to a method and/or electronic design automation (EDA) tool for creating a layout for design representation of an electronic circuit with at least one port, and a corresponding port for an integrated or electronic circuit. Still more particularly, the present invention relates to a data processing program and a computer program product for creating a layout for design representation of an electronic circuit with at least one port.

2. Description of the Related Art

The following definitions apply throughout the following specification. An electronic circuit is an element which may be used multiple times on an IC. It is typically an element of a technology circuit library. A net represents a connection which must be made between sets of source and sink pins on an IC. A wire is a set of connected conductors which form the connection represented by a net. A wire segment is a contiguous region of a single conducting layer of an IC which is a portion of a wire. A via is a conductor which forms a connection between different conducting layers of an IC, and which is a portion of a wire. A pin or port is a conducting region of a circuit instance to which a wire is connected.

In the U.S. Pat. No. 6,308,302 "Semiconductor wiring technique for reducing electromigration" by International Business Machines Corporation, a method and system of improving upon effects of electromigration on Integrated Circuits (IC) are disclosed. The disclosed method uses an optimized width of wires for interconnection of pins. Further, capacitive targets are utilized for controlling the current density. The method of categorizing nets based on width of wires, and considering RC delay of the circuit for improving upon the timing of circuit, takes as input a netlist which describes the circuits to be implemented on the IC and the interconnections between them. Each item in the netlist is defined in the circuit library which is accessible by any tool in the design tool. The categories of nets that are known by the designer to require special electromigration treatment, if any, such as high fan-out nets, are obtained. The nets are then sorted into categories based on discrete wire widths.

In the U.S. Pat. No. 7,131,096 "Method of automatically routing nets according to current density rules" by Pulsic Limited, a method and system of automatically routing interconnections within an Integrated Circuit (IC) based on current density rules are disclosed. The method includes varying size of nets based on the current density requirements. Further, utilizing a timing engine to determine paths having the least timing delay for critical nets is also disclosed. The method of determining paths having the least timing delay for critical nets in an IC via a timing engine is disclosed as a technique which automatically route interconnections of an integrated circuit while taking into consideration current density rules.

In the paper "FPGA Design Automation: A Survey" by Deming Chen et al, Foundations and Trends in Electronic Design Automation Vol. 1, No 3 (November 2006) 195-330c, a method of assigning weights to multiple nets in an IC layout based on timing criticality of nets for avoiding slacks and routing resources based on these weights is disclosed. Timing constraints are typically specified as the maximum path delay constraints from the primary inputs and/or FF outputs to primary outputs and/or FF inputs. Given a mapped and placed circuit, one can perform static timing analysis to compute the signal arrival times and required times at every pin in the design, and then compute the slack at every pin and every source-sink pair in each net. The nets with smaller slacks are more critical. The simplest form of timing optimization is to order the nets by their timing criticality, so that timing-critical nets are routed first to avoid long detours.

The prior art is disclosing a method of categorizing nets based on width of wires and considering RC delay of the circuit for improving upon the timing of circuit, and a method of determining paths having least timing delay for critical nets in an IC via a timing engine.

In the prior art, pin or port shapes get defined to allow routing access under all circumstances, therefore the port size is larger than necessary. Different connection points to the port lead to different resistive paths leading to different timing rules. The timing rules must guard band non-optimal connections. The correct timing can be determined only after routing and extraction, when the connection to the pin is known.

SUMMARY

The technical problem underlying the invention is to provide a method for creating a layout for design representation of an electronic circuit with at least one port and/or a corresponding port, which allows to determine a correct timing during the routing process, and to provide an electronic design automation (EDA) tool, a data processing program and a computer program product to perform the method for creating a layout for design representation of an electronic circuit with at least one port.

According to the invention, this problem is solved by providing a method for creating a layout for design representation of an electronic circuit with at least one port having the features of claim 1, a port for an electronic circuit having the features of claim 11, an electronic design automation (EDA) tool for creating a layout for design representation of an electronic circuit with at least one port having the features of claim 13, a data processing program for performing the method for creating a layout for design representation of an electronic circuit with at least one port having the features of claim 14, and a computer program product causing a computer to perform the method for creating a layout for design representation of an electronic circuit with at least one port having the features of claim 15. Advantageous embodiments of the invention are mentioned in the sub claims.

Accordingly, in an embodiment of the present invention, a method for creating a layout for design representation of an electronic circuit with at least one port comprises segmenting the at least one port in the design representation into different regions, classifying the different regions of the at least one port according to timing and/or electronic and/or layout characteristics, assigning a priority for each classified region of the at least one port according to rules based on the timing and/or electronic and/or layout characteristics, and routing the design representation by accessing at least one of the classified regions of the port according to an order of the assigned priorities.

In further embodiments of the present invention, the timing and/or electronic and/or layout characteristics comprise rise time information and/or fall time information and/or delay time information and/or inductivity information and/or capacitance information and/or impedance information and/or resistance information and/or frequency information and/or electromigration information and/or layout position information.

In further embodiments of the present invention, for each port region of the electronic circuit, allowable maximum slew and/or timing error and/or slew error and/or electromigration are set as rules by circuit analysis.

In further embodiments of the present invention, a maximum load is calculated for an output port region based on the maximum slew and/or electromigration.

In further embodiments of the present invention, input capacitance and/or input resistance for an input port region is determined by circuit analysis.

In further embodiments of the present invention, maximum resistance error for rising and falling slope of the output port region and/or input port region are calculated to not exceed given threshold values for the maximum timing error and/or the maximum slew error.

In further embodiments of the present invention, a maximum path distance for each region is calculated as rule based on the maximum resistance error, where the regions are segmented to not exceed the maximum path distance.

In further embodiments of the present invention, the routing of the design representation is started using a default or a highest or lowest priority of the region classes.

In further embodiments of the present invention, the routing of the design representation is accessing the regions of different ports of the design representation in order of their assigned priorities.

In further embodiments of the present invention, a region of lower and/or higher priority is accessed when no region of the current priority can be accessed due to existing congestion or broken rules based on the timing and/or electronic and/or layout characteristics.

In another embodiment of the present invention, a port for an electronic circuit is disclosed, where a port area is segmented into different regions which are classified according to timing and/or electronic and/or layout characteristics, where a priority is assigned to each classified region according to rules based on the timing and/or electronic and/or layout characteristics, and at least one of the classified regions is accessed according to an order of the assigned priorities during routing of the design representation.

In further embodiments of the present invention, the timing and/or electronic and/or layout characteristics comprise rise time information and/or fall time information and/or delay time information and/or inductivity information and/or capacitance information and/or impedance information and/or resistance information and/or frequency information and/or electromigration information and/or layout position information.

In another embodiment of the present invention, an electronic design automation tool for performing the above described method for creating a layout for design representation of an electronic circuit is disclosed.

In another embodiment of the present invention, a data processing program for execution in a data processing system comprises software code portions for performing the above described method for creating a layout for design representation of an electronic circuit when the program is run on the data processing system.

In yet another embodiment of the present invention, a computer program product stored on a computer-usable medium, comprises computer-readable program means for causing a computer to perform the above described method for creating a layout for design representation of an electronic circuit when the program is run on the computer.

All in all, embodiments of the invention disclosed herein allow an accurate timing based on the port region access without the need for shapes level extraction. Due to the inventive method, fewer design iterations and less guard banding are required and more aggressive design is possible. Further improvements can be achieved by creating electromigration rules based on different port regions.

The core idea of this invention is to segment the port into regions and to assign classes to the regions along with priorities. For each different port region class, a timing rule generation is done.

The above, as well as additional purposes, features, and advantages of the present invention will become apparent in the following detailed written description.

BRIEF DESCRIPTION OF THE SEVERAL VIEWS OF THE DRAWINGS

A preferred embodiment of the invention, as described in detail below, is shown in the drawings, in which.

DETAILED DESCRIPTION

Figure 1:
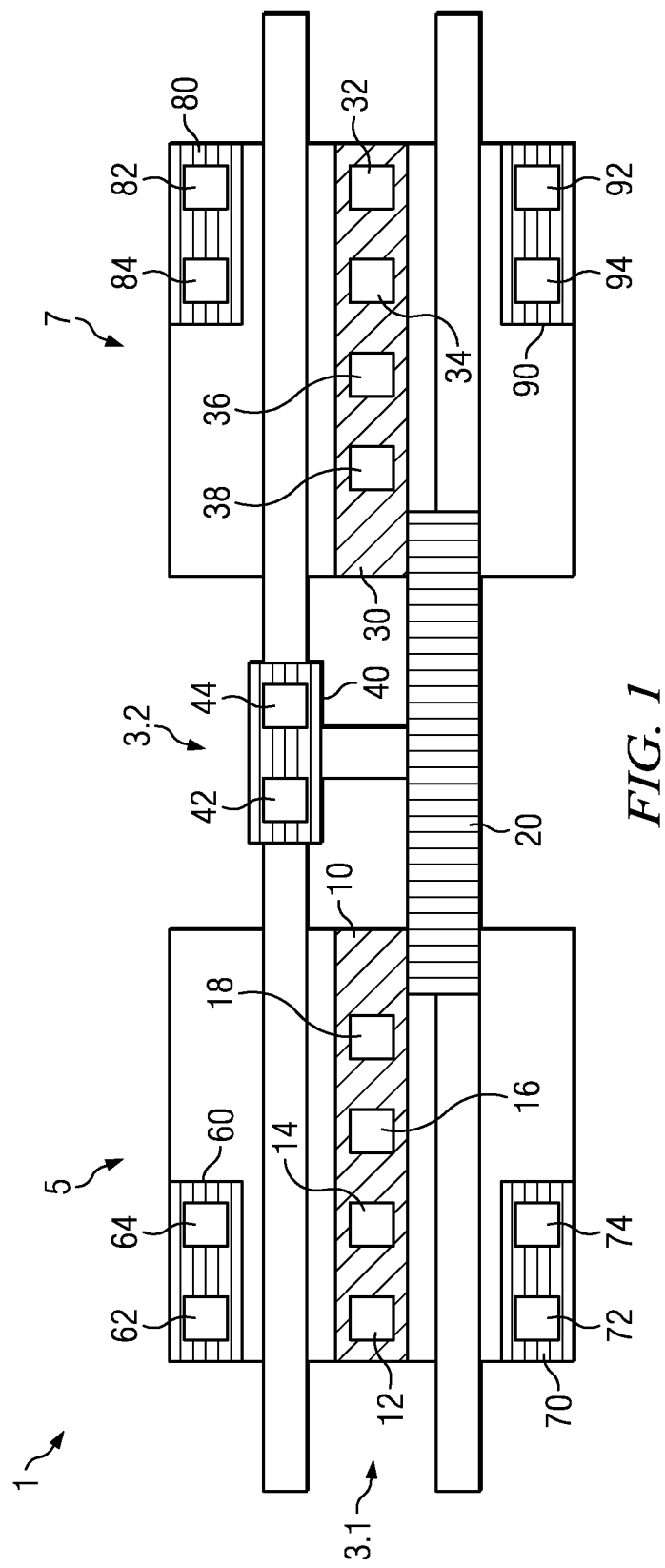
FIG. 1 is a layout diagram of an electronic circuit arrangement with at least one port, in accordance with an embodiment of the present invention.
Figure 2:
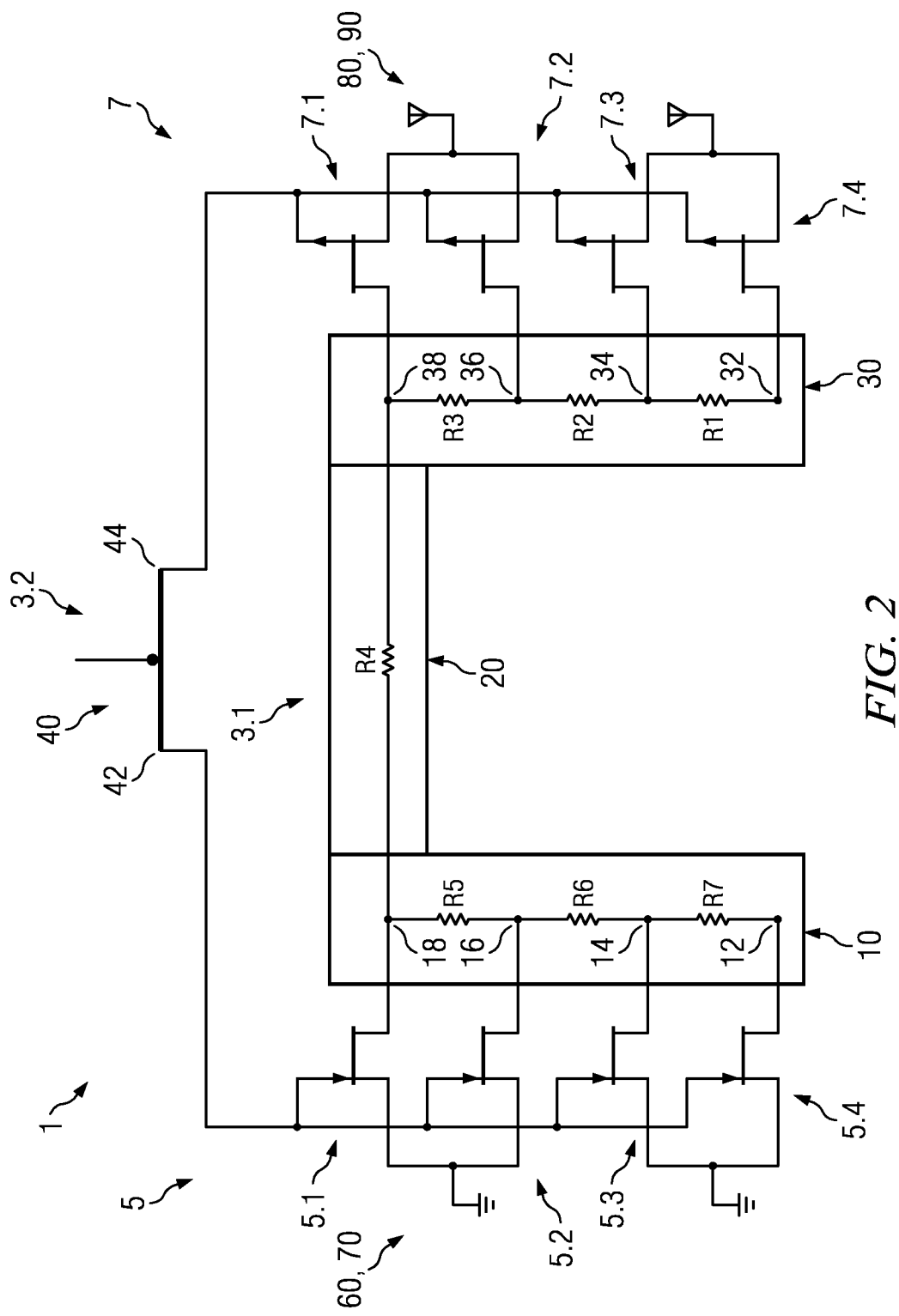
FIG. 2 is a detailed equivalent circuit diagram of the electronic circuit arrangement according to FIG. 1.

FIG. 1 is a layout diagram of an electronic circuit arrangement 1 with an output port 3.1 and an input port 3.2, in accordance with an embodiment of the present invention, and FIG. 2 is a corresponding detailed equivalent circuit diagram of the electronic circuit arrangement 1 according to FIG. 1. The electronic circuit 1 is part of an integrated circuit (IC), for example. According to FIGS. 1 and 2, no connecting line 50 (FIG. 4), 50' (FIG. 6), 50" (FIG. 8) is accessing the ports 3.1, 3.2 of the electronic circuit 1.

Referring to FIG. 1, the shown embodiment of the electronic circuit 1 employs two ports formed as output port 3.1 and input port 3.2, a NFET area 5 comprising four NFETs 5.1, 5.2, 5.3, 5.4, a PFET area 7 comprising four PFETs 7.1, 7.2, 7.3, 7.4, two ground regions 60, 70 to connect the electronic circuit 1 with a ground voltage, and two supply voltage regions 80, 90 to connect the electronic circuit 1 with a supply voltage. According to the invention, the output port 3.1 is segmented into different regions 10, 20, 30 which are classified according to timing and/or electronic and/or layout characteristics, where a priority is assigned to each classified region 10, 20, 30 according to rules based on the timing and/or electronic and/or layout characteristics. At least one of the classified regions 10, 20, 30 is accessed according to an order of the assigned priorities during routing of the design representation of the integrated circuit comprising the electronic circuit 1. The timing and/or electronic and/or layout characteristics comprise rise time information and/or fall time information and/or delay time information and/or inductivity information and/or capacitance information and/or impedance information and/or resistance information and/or frequency information and/or electromigration information and/or layout position information, for example.

Still referring to FIGS. 1 and 2, the first region 10 of the output port 3.1 comprises four transistor contact points 12, 14, 16, 18 where drains of NFETs 5.1, 5.2, 5.3, 5.4 are connected to the first region 10 of the output port 3.1. In the equivalent circuit diagram of FIG. 2, distances between the four transistor contact points 12, 14, 16, 18 are represented by resistors R1, R2, R3, and the second region 20 of the output port 3.1 is represented by a resistor R4. The third region 30 of the output port 3.1 comprises four transistor contact points 32, 34, 36, 38 where drains of four PFETs 7.1, 7.2, 7.3 and 7.4 are connected to the third region 30 of the output port 3.1. In the equivalent circuit diagram of FIG. 2, distances between the four transistor contact points 32, 34, 36, 38 are represented by resistors R5, R6, R7. In the shown embodiment, three regions 10, 20, of the output port 3.1 are classified. The first and third region 10, 20 may be further classified in subclasses in accordance with the different resistance values R1, R2, R3 and/or R5, R6, R7 along the distance of the corresponding region 10, 30.

The region 40 of the input port 3.2 comprises two transistor contact points 42, 44 where gates of four NFETs 5.1, 5.2, 5.3 and 5.4 or gates of four PFETs 7.1, 7.2, 7.3 and 7.4 are connected to the region 40 of the input port 3.2. A first ground region 60 of the electronic circuit 1 comprises two transistor contact points 62, 64 where sources of a first and a second NFET 5.1, 5.2 are connected to the first ground region 60 of the electronic circuit 1. A second ground region 70 of the electronic circuit 1 comprises two transistor contact points 72, 74 where sources of a third and fourth NFET 5.3, 5.4 are connected to the second ground region 70 of the electronic circuit 1. A first supply voltage region 80 of the electronic circuit 1 comprises two transistor contact points 82, 84 where sources of a first and second PFET 7.1, 7.2 are connected to the first supply voltage region 80 of the electronic circuit 1. A second supply voltage region 90 of the electronic circuit 1 comprises two transistor contact points 92, 94 where sources of a third and fourth PFET 7.3, 7.4 are connected to the second supply voltage region 90 of the electronic circuit 1.

Figure 3:
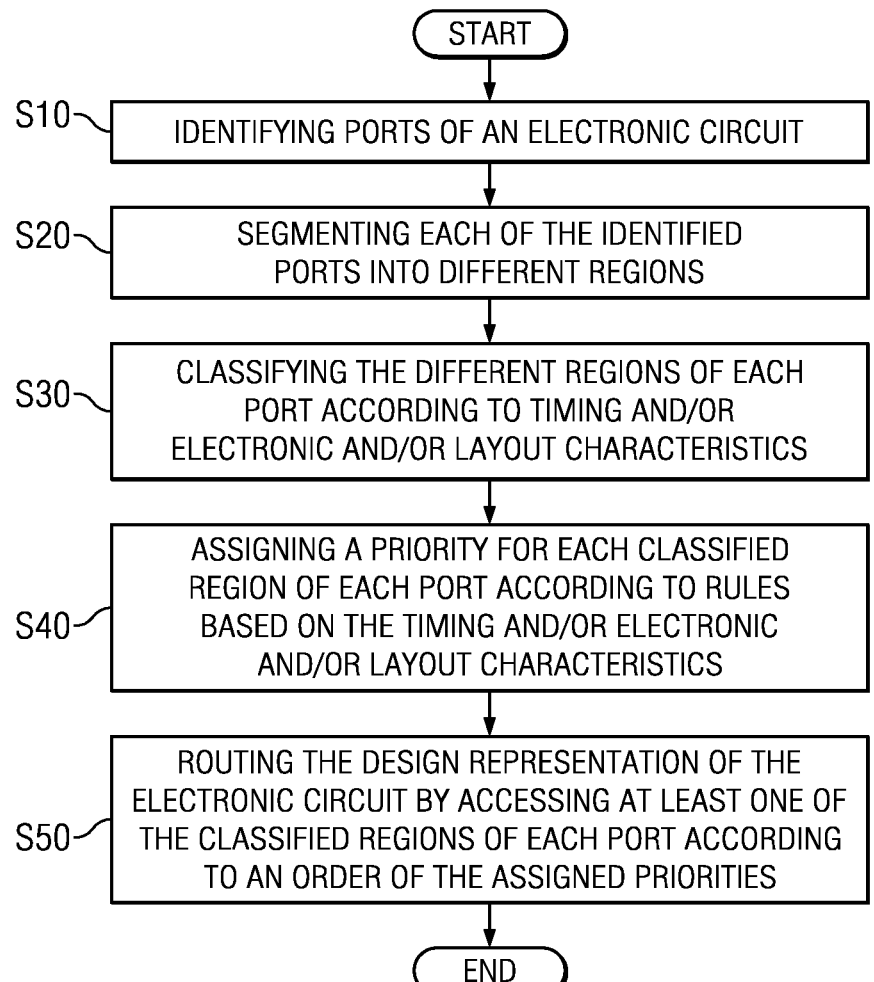
FIG. 3 is a flow chart of a method for creating a layout for design representation of an electronic circuit with at least one port, in accordance with an embodiment of the present invention.

FIG. 3 is a flow chart of a method for creating a layout for design representation of an electronic circuit 1 with at least one port 3.1, 3.2, in accordance with an embodiment of the present invention.

Referring to FIG. 3, the flowchart depicts how a layout for design representation of an electronic circuit 1 with at least one port 3.1, 3.2 is created. After an initialization, ports 3.1, 3.2 of the electronic circuit 1 are identified in step S10. In step S20, at least one port 3.1, 3.2 in the design representation is segmented into different regions 10, 20, 30, 40. In the shown embodiment, the output port 3.1 is segmented in three regions 10, 20, 30 and the input port 3.2 is segmented in one region 40. In step S30, the different regions 10, 20, 30, 40 of the at least one port 3.1, 3.2 are classified according to timing and/or electronic and/or layout characteristics. In step S40, a priority for each classified region 10, 20, 30, 40 of the at least one port 3.1, 3.2 is assigned according to rules based on the timing and/or electronic and/or layout characteristics, and in step S50 the design representation is routed by accessing at least one of the classified regions 10, 20, 30, 40 of the at least one port 3.1, 3.2 according to an order of the assigned priorities. The timing and/or electronic and/or layout characteristics comprise rise time information and/or fall time information and/or delay time information and/or inductivity information and/or capacitance information and/or impedance information and/or resistance information and/or frequency information and/or electromigration information and/or layout position information, for example.

For each identified port 3.1, 3.2 of the electronic circuit 1, region boundaries are assigned, timing rules are generated by circuit analysis, class priorities are assigned based on the timing results from circuit analysis, and a port data model is generated.

The generated data model structure comprises physical data like layer, purpose, total outline and a list of the port region classes of the port 3.1, 3.2 or pin, for example. The port region classes comprises a list of port regions 10, 20, 30, 40, physical data like layer, purpose or total outline of the port regions 10, 20, 30, 40, port timing rules and class priorities, where the first entry is a default region class. Additionally, the data model structure comprises timing rules with the port name, a list of corresponding port region classes and information about timing, electronic and/or layout characteristics like input capacitance, input and/or output resistance, timing behavior, cutoff and/or threshold frequencies, checks, etc.

For each identified port 3.1, 3.2 of the electronic circuit 1, the allowable maximum slew $s_{max}$ and/or timing error $t_{err,\,max}$ and/or slew error $s_{err,\,max}$ and/or electromigration like maximum direct current $I_{DC,\,max}$, maximum effective current $I_{rms,\,max}$ and/or maximum peak current $I_{peak,\,max}$ are set as rules by circuit analysis in accordance with the used technology, project, or library. Based on the maximum slew $s_{max}$ and/or electromigration, a maximum load $C_{max}$ for the output port 3.1 is calculated. Additionally, maximum resistance error $R_{err,\,max}$ for rising and falling slope of the output port 3.1 are calculated to not exceed given threshold values for the maximum timing error $t_{err,\,max}$ and/or said maximum slew error $s_{max}$. The maximum resistance error $R_{err,\,max}$ is calculated such that:

$$t_{err,max} <= R_{err,max} * C_{max} \tag{1}$$

likewise $$s_{err,max} <= R_{err,max} / R_{driver} * s_{max} (\%) \tag{2}$$

For the input port 3.2, the input capacitance $C_{input}$ and/or input resistance $R_{input}$ is determined by circuit analysis. The input capacitance $C_{input}$ and input resistance $R_{input}$ might be region dependent if optional regions exist to enable cutback. Additionally, maximum resistance error $R_{err,\,max}$ for rising and falling slope of the input port 3.2 are calculated to not exceed given threshold values for the maximum timing error $t_{err,\,max}$ and/or said maximum slew error $s_{max}$. The maximum resistance error $R_{err,\,max}$ is calculated such that:

$$t_{err,max} <= R_{err,max} * C_{input} \quad (3)$$

likewise $$s_{err,max} <= R_{err,max}/R_{input} * s_{max}(\%) \quad (4).$$

The ports 3.1, 3.2 are segmented into regions 10, 20, 30, 40 based on the maximum path distances, for example, with each region 10, 20, 30, and 40 spanning a path distance d with a resistance which is equal to the maximum resistance error $R_{err,\,max}$.

The port region class based routing comprises global routing and detail routing. The routing of the design representation is started using a default or a highest or lowest priority of the region classes. The routing of the design representation is accessing the regions 10, 20, 30, 40 of different ports of the design representation in order of their assigned priorities, where just two different ports 3.1, 3.2 of the electronic circuit 1 are shown, and where a region 10, 20, 30, 40 of lower and/or higher priority is accessed when no region of said current priority can be accessed due to existing congestion or broken rules based on the timing and/or electronic and/or layout characteristics.

During routing, the first region 10 of the output port 3.1 is accessed to achieve a short switch off time, where the third region 30 of the output port 3.1 is accessed to achieve a short switch on time, and where the second region 20 of the output port 3.1 is accessed to achieve balanced switch timing. So if timing is critical on a net, a port region 10, 20, 30 with high class priority is tried to connect to before choosing remaining port regions. Possibly other nets are ripped up to achieve a preferred connection. If timing can be relaxed and if congestion exists at the corresponding port 3.1, 3.2, a lower class priority port region 10, 20, 30, 40 will be connected instead.

Figure 4:
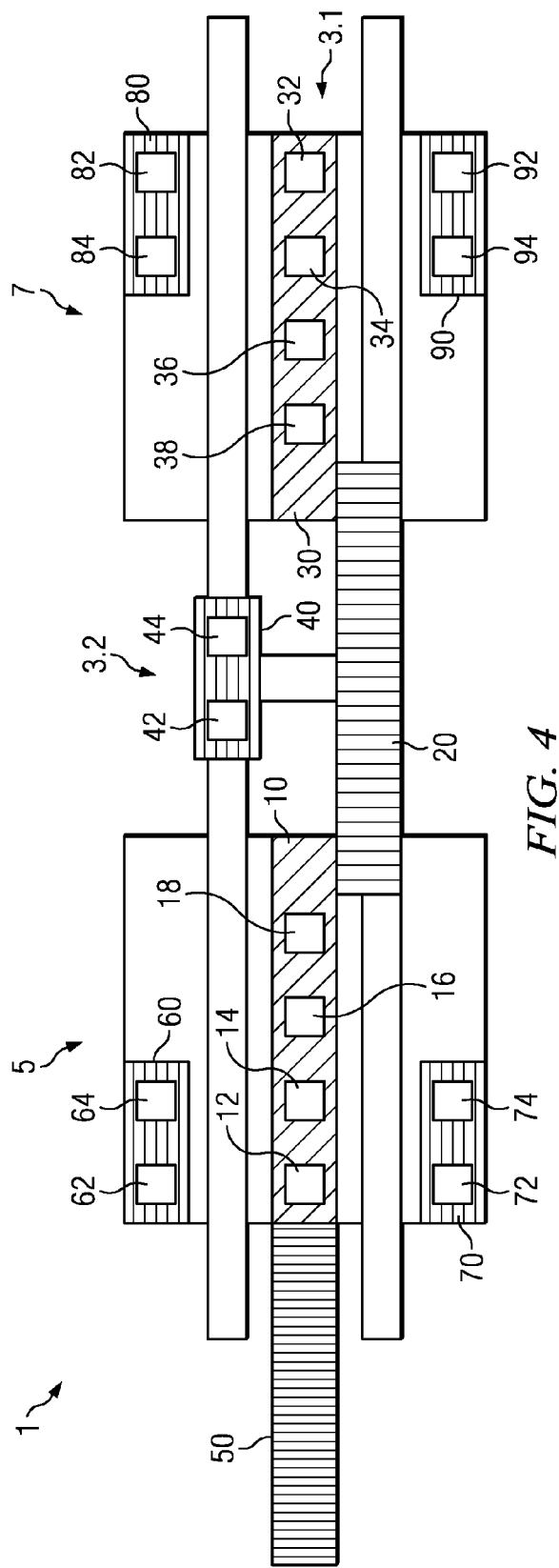
FIG. 4 is a layout diagram of the electronic circuit arrangement with at least one port of FIG. 1, which is accessed in accordance with a first accessing possibility.
Figure 5:
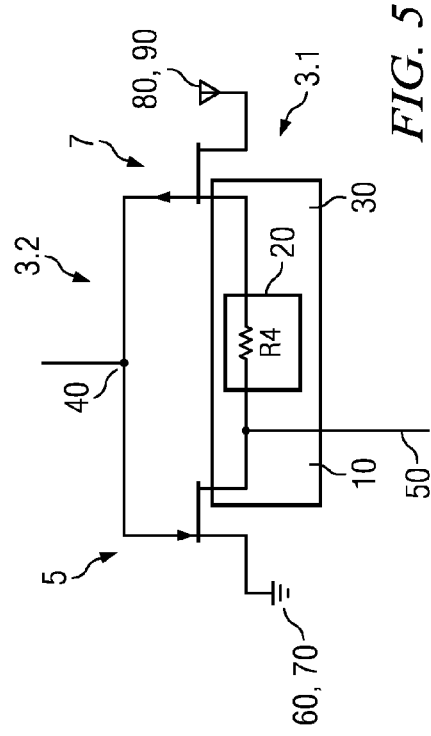
FIG. 5 is an equivalent circuit diagram of the electronic circuit arrangement according to FIG. 4.

FIG. 4 is a layout diagram of the electronic circuit arrangement 1 of FIG. 1 with the output port 3.1 and the input port 3.2, and FIG. 5 is a corresponding equivalent circuit diagram of the electronic circuit arrangement 1 according to FIG. 4, where a connecting line 50 is accessing the electrical circuit 1 at the first region 10 of the output port 3.1 to achieve a short switch off time.

Figure 6:
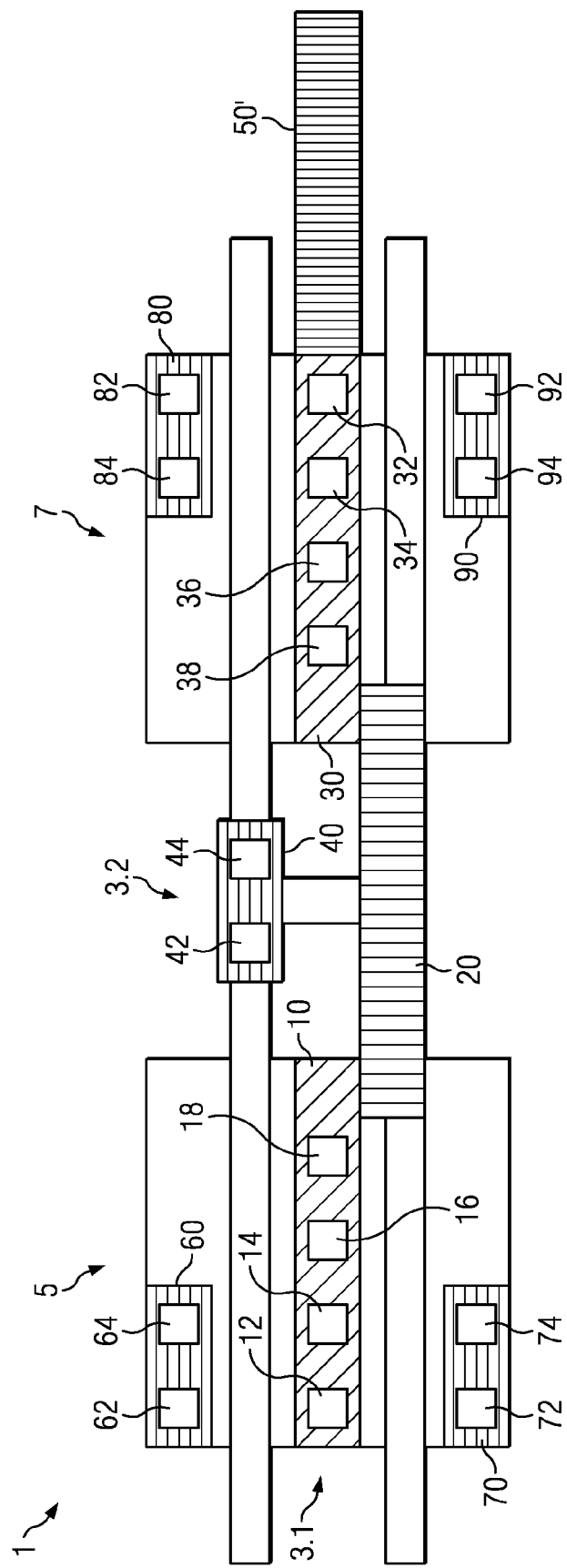
FIG. 6 is a layout diagram of the electronic circuit arrangement with at least one port of FIG. 1, which is accessed in accordance with a second accessing possibility.
Figure 7:
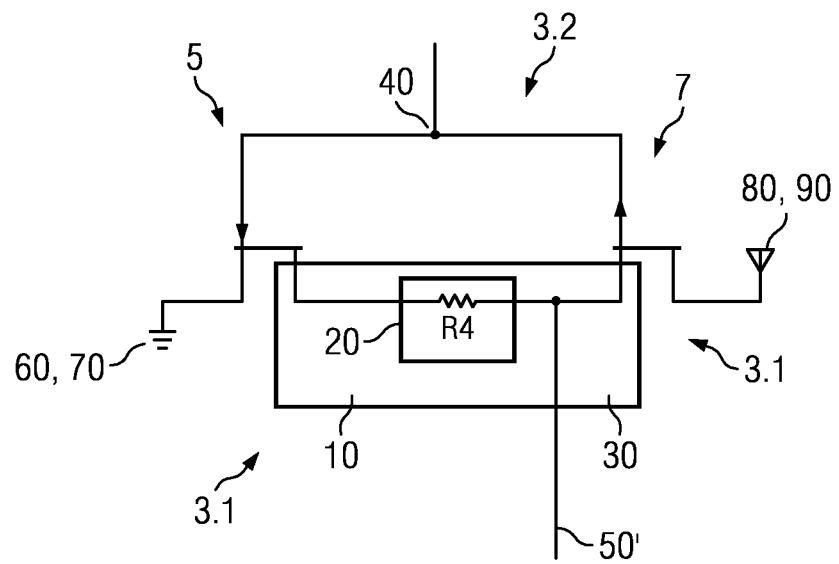
FIG. 7 is an equivalent circuit diagram of the electronic circuit arrangement according to FIG. 6.

FIG. 6 is a layout diagram of the electronic circuit arrangement 1 of FIG. 1 with the output port 3.1 and the input port 3.2, and FIG. 7 is a corresponding equivalent circuit diagram of the electronic circuit arrangement 1 according to FIG. 6, where a connecting line 50' is accessing the electrical circuit 1 at the third region 30 of the output port 3.1 to achieve a short switch on time.

Figure 9:
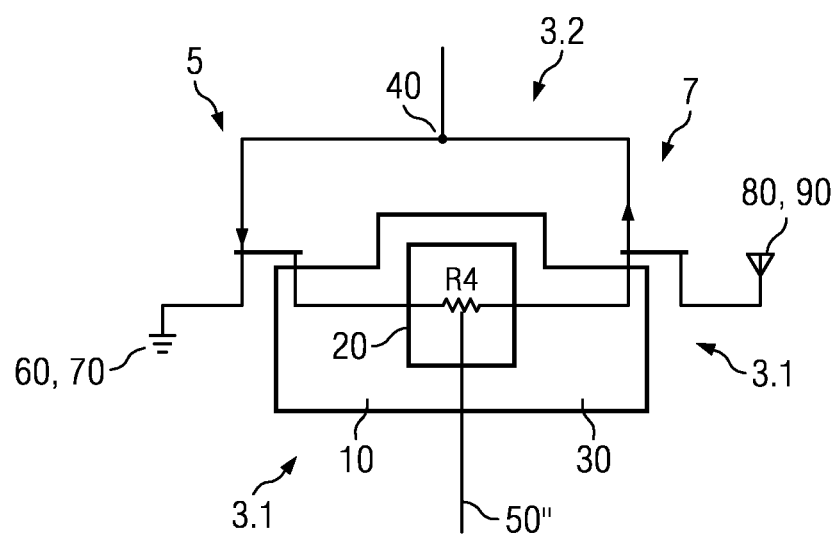
FIG. 9 is an equivalent circuit diagram of the electronic circuit arrangement according to FIG. 8.
Figure 8:
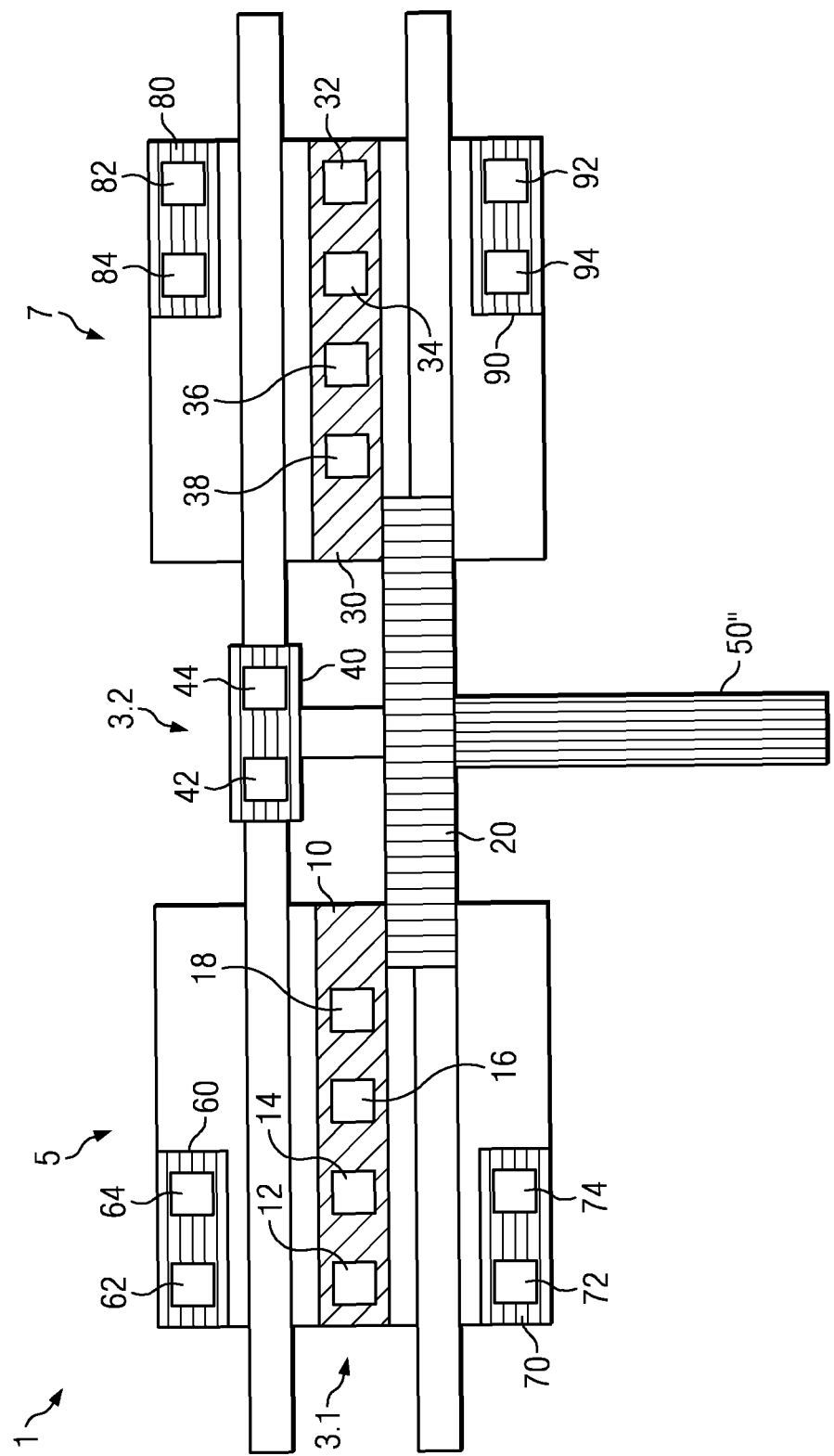
FIG. 8 is a layout diagram of the electronic circuit arrangement with at least one port of FIG. 1, which is accessed in accordance with a third accessing possibility.

FIG. 8 is a layout diagram of the electronic circuit arrangement 1 of FIG. 1 with the output port 3.1 and the input port 3.2, and FIG. 9 is a corresponding equivalent circuit diagram of the electronic circuit arrangement 1 according to FIG. 8, where a connecting line 50" is accessing the electrical circuit 1 at the second region 20 of the output port 3.1 to achieve balanced switch timing.

Figure 10:
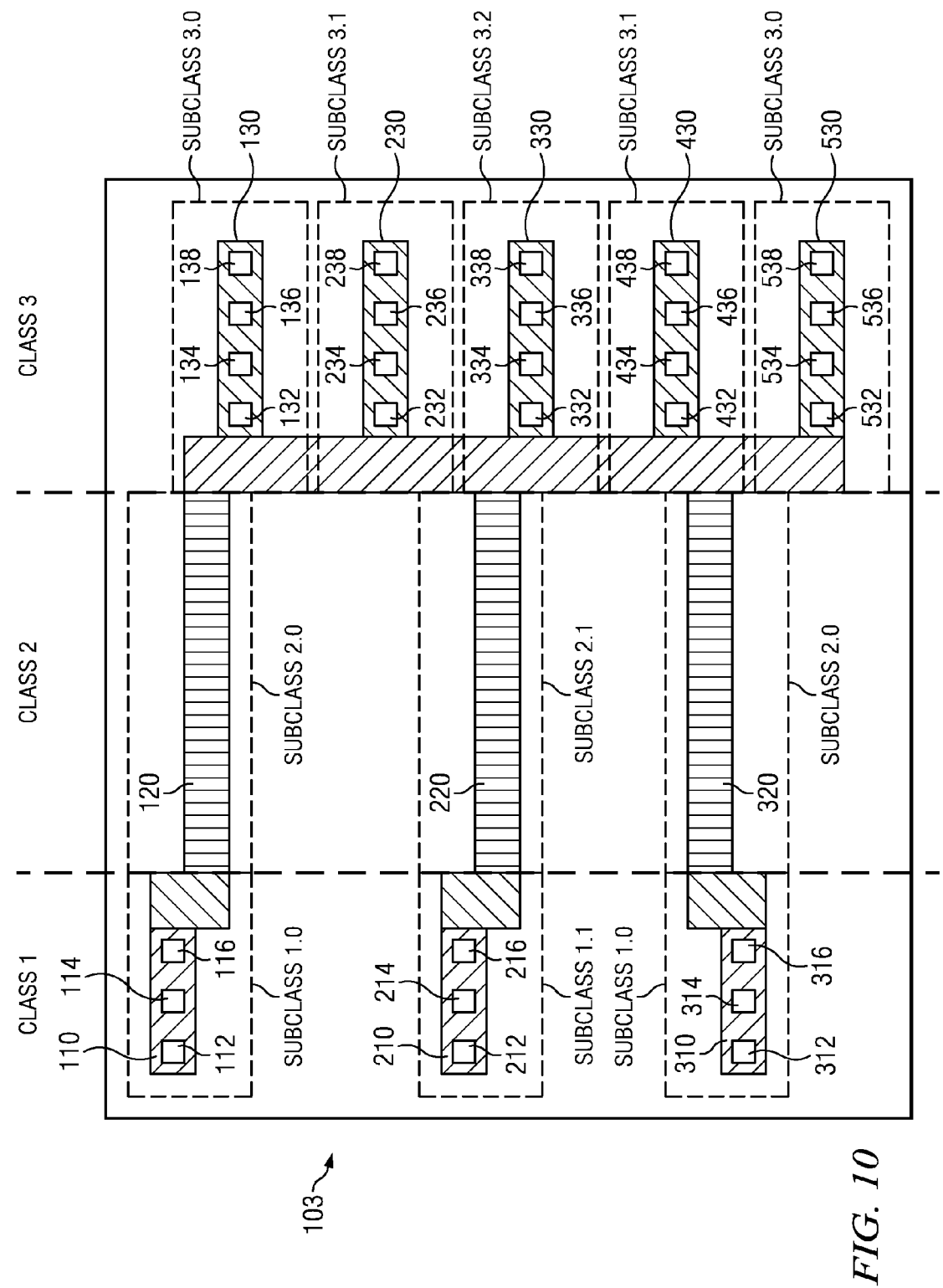
FIG. 10 is a layout diagram of an output port, in accordance with another embodiment of the present invention.

FIG. 10 is a layout diagram of a more complex example of an output port 103, in accordance with another embodiment of the present invention.

Referring to FIG. 10, the shown embodiment of the output port 103 of an electronic circuit, not shown, is segmented into different regions 110, 120, 130, 210, 220, 230, 310, 320, 330, 430, and 530 which are classified in three main classes Class 1, Class 2 and Class 3 according to timing and/or electronic and/or layout characteristics, where a priority is assigned to each classified region 110, 120, 130, 210, 220, 230, 310, 320, 330, 430, and 530 according to rules based on the timing and/or electronic and/or layout characteristics. In the shown embodiment, the regions 110, 210, 310 are assigned to a first class Class 1, which could be accessed to achieve a short switch off time, where the regions 120, 220, 320 are assigned to a second class Class 2, which could be accessed to achieve balanced switch timing, and the regions 130, 230, 330, 430, 530 are assigned to a third class Class 3, which could be accessed to achieve a short switch on time. According to the layout position, the main classes Class 1, Class 2, Class 3 are each divided in subclasses Subclass 1.0, Subclass 1.1, Subclass 2.0, Subclass 2.1, Subclass 3.0, Subclass 3.1, Subclass 3.2, respectively, having different timing and/or electronic and/or layout characteristics. So a first region 110 and a seventh region 310 of the output port 103 are assigned to a first subclass Subclass 1.0 of a first main class Class 1. A fourth region 210 of the output port 103 is assigned to a second subclass Subclass 1.1 of the first main class Class 1. A second region 110 and an eighth region 320 of the output port 103 are assigned to a first subclass Subclass 2.0 of a second main class Class 2. A fifth region 220 of the output port 103 is assigned to a second subclass Subclass 2.1 of the second main class Class 2. A third region 130 and an eleventh region 530 of the output port 103 are assigned to a first subclass Subclass 3.0 of a third main class Class 3. A sixth region 230 and a tenth region 430 of the output port 103 are assigned to a second subclass Subclass 3.1 of the third main class Class 3. A ninth region 330 of the output port 103 is assigned to a third subclass Subclass 3.2 of the third main class Class 3. At least one of the classified regions 110, 120, 130, 210, 220, 230, 310, 320, 330, 430, and 530 is accessed according to an order of the assigned priorities during routing of the design representation of the integrated circuit comprising the output port 103.

Still referring to FIG. 10, the first, fourth and seventh regions 110, 210, 310 of the output port 3.1 each comprises three transistor contact points 112, 114, 116, 212, 214, 216, 312, 314, 316 where drains of NFETs are connected to the corresponding region 110, 210, 310 of the output port 103. The third, sixth, ninth, tenth and eleventh region 130, 230, 330, 430, 530 of the output port 3.1 each comprises four transistor contact points 132, 134, 136, 138, 232, 234, 236, 238, 332, 334, 336, 338, 432, 434, 436, 438, 532, 534, 536, 538 where drains of PFETs are connected to the corresponding region 130, 230, 330, 430, 530 of the output port 103. The regions 110, 120, 130, 210, 220, 230, 310, 320, 330, 430, and 530 of the output port 103 may be further classified in further subclasses based on timing and/or electronic and/or layout characteristics.

The inventive method for creating a layout for design representation of an electronic circuit with at least one port can be implemented as an entirely software embodiment, or an embodiment containing both hardware and software elements. In a preferred embodiment, the invention is implemented in software, which includes but is not limited to firmware, resident software, microcode, etc and is run by an electronic design automation tool for example.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method performed by a computer for creating a layout for design representation of an electronic circuit with at least one port, comprising steps of:
   the computer segmenting a given port of said at least one port in said design representation into different regions;
   the computer classifying said different regions of said given port according to at least one of timing, electronic and layout characteristics;
   the computer forming assigned priorities and classified regions by assigning a priority for each classified region of said given port according to rules based on said at least of one timing, electronic and layout characteristics; and
   the computer routing said design representation by accessing at least one of said classified regions of said given port according to an order of said assigned priorities.

2. The method according to claim 1, wherein said at least one of timing, electronic and layout characteristics comprises at least one of rise time information, fall time information, delay time information, inductivity information, capacitance information, impedance information, resistance information, frequency information, electromigration information, and layout position information.

3. The method according to claim 1, wherein for each port region of said electronic circuit, at least one of allowable maximum slew, maximum timing error, maximum slew error, and maximum electromigration is set to be a rule by circuit analysis.

4. The method according to claim 3, wherein a maximum load is calculated for an output port region based on at least one of said maximum slew and said maximum electromigration.

5. The method according to claim 3, wherein at least one of input capacitance and input resistance for an input port region is determined by circuit analysis.

6. The method according to claim 1, wherein said routing of said design representation is started using one of a default priority, a highest priority, and a lowest priority of said region classes.

7. The method according to claim 6, wherein said regions of different ports of said design representation are accessed in order of their assigned priorities during routing of said design representation.

8. The method of claim 1, wherein the method is performed by an electronic design automation tool executing on the computer.

9. A method performed by a computer for creating a layout for design representation of an electronic circuit with at least one port, comprising steps of:
   the computer segmenting said at least one port in said design representation into different regions;
   the computer classifying said different regions of said at least one port according to at least one of timing, electronic and layout characteristics;
   the computer forming assigned priorities and classified regions by assigning a priority for each classified region of said at least one port according to rules based on said at least of one timing, electronic and layout characteristics; and
   the computer routing said design representation by accessing at least one of said classified regions of said at least one port according to an order of said assigned priorities, wherein for each port region of said electronic circuit, at least one of allowable maximum slew, maximum timing error, maximum slew error, and maximum electromigration is set to be a rule by circuit analysis, wherein at least one of input capacitance and input resistance for an input port region is determined by circuit analysis, wherein a maximum resistance error for a rising and falling slope of at least one of said output port region and input port region are calculated to not exceed given threshold values for at least one of said maximum timing error and said maximum slew error.

10. The method according to claim 9, wherein a maximum path distance for each region is calculated to be a rule based on said maximum resistance error, where said regions are segmented to not exceed said maximum path distance.

11. A method performed by a computer for creating a layout for design representation of an electronic circuit with at least one port, comprising steps of:
   the computer segmenting said at least one port in said design representation into different regions;
   the computer classifying said different regions of said at least one port according to at least one of timing, electronic and layout characteristics;
   the computer forming assigned priorities and classified regions by assigning a priority for each classified region of said at least one port according to rules based on said at least of one timing, electronic and layout characteristics; and
   the computer routing said design representation by accessing at least one of said classified regions of said at least one port according to an order of said assigned priorities, wherein said routing of said design representation is started using one of a default priority, a highest priority, and a lowest priority of said region classes, and wherein a region of lower or higher priority is accessed when no region of said current priority can be accessed due to existing congestion or broken rules based on said at least one of timing, electronic, and layout characteristics.

12. A port for an electronic circuit, wherein a port area of the port is segmented into different regions which are classified according to at least one of timing, electronic, and layout characteristics, wherein a priority is assigned to each classified region according to rules based on said at least one of timing, electronic, and layout characteristics, and at least one of said classified regions is accessed according to an order of said assigned priorities during routing of a design representation of the electronic circuit.

13. The port according to claim 12, wherein said at least one of timing, electronic, and layout characteristics comprises at least one of rise time information, fall time information, delay time information, inductivity information, capacitance information, impedance information, resistance information, frequency information, electromigration information, and layout position information.

14. A data processing program stored in a memory of a data processing system, said program comprising software code portions for performing, when said program is run on said data processing system, steps of:
- segmenting a given port of said at least one port in said design representation into different regions;
- classifying said different regions of said given port according to at least one of timing, electronic and layout characteristics;
- forming assigned priorities and classified regions by assigning a priority for each classified region of said given port according to rules based on said at least of one timing, electronic and layout characteristics; and
- routing said design representation by accessing at least one of said classified regions of said given port according to an order of said assigned priorities.

15. A computer program product stored on a non-transitory computer-usable medium, comprising computer-readable program code for causing a computer to perform, when said program is run on said computer, steps of:
- segmenting a given port of said at least one port in said design representation into different regions;
- classifying said different regions of said given port according to at least one of timing, electronic and layout characteristics;
- forming assigned priorities and classified regions by assigning a priority for each classified region of said given port according to rules based on said at least of one timing, electronic and layout characteristics; and
- routing said design representation by accessing at least one of said classified regions of said given port according to an order of said assigned priorities.

* * * * *